Jan. 13, 1970 W. M. GARDNER ET AL 3,489,507
FILTER METHOD AND APPARATUS FOR REMOVING
HYDRAZINE AND DERIVATIVES OF HYDRAZINE
Filed Dec. 1, 1967

INVENTORS
WESLEY M. GARDNER
WILLIAM H. REVOIR
BY
J. Albert Hultquist
ATTORNEY

United States Patent Office 3,489,507
Patented Jan. 13, 1970

3,489,507
FILTER METHOD AND APPARATUS FOR REMOVING HYDRAZINE AND DERIVATIVES OF HYDRAZINE
Wesley M. Gardner, Bristol, R.I., and William H. Revoir, West Hartford, Conn., assignors to American Optical Corporation, Southbridge, Mass., a corporation of Delaware
Filed Dec. 1, 1967, Ser. No. 687,337
Int. Cl. B01d 47/02
U.S. Cl. 23—2                  10 Claims

ABSTRACT OF THE DISCLOSURE

A filter containing a sorbent bed consisting of two different solid porous granular materials, in which only one of the materials is impregnated with a strong oxidizing agent. The sorbent bed is incorporated in a cartridge to provide an improved filter method for hydrazine and organic derivatives of hydrazine.

BACKGROUND OF THE INVENTION

Field of the invention

A filter method and apparatus for removing hydrazine and organic derivatives of hydrazine from fluids.

Description of the prior art

In many of the prior art filters the removal of gaseous contaminants in air is accomplished by solid porous granular materials such as activated charcoal. It is known that activated charcoal has an incredible surface area and that some gases can be sorbed through this surface. The filter as found in U.S. Patent No. 2,582,388, operates by having two different porous materials, that is layers of activated charcoal, separated by a layer of silica, act selectively on contaminants to be removed from the fluids passing through it. U.S. Patent No. 1,789,262 teaches the use of a three-layer filter, the layers consisting of hopcalite, activated charcoal and pumice.

Some of the prior art filters operates by having chemicals introduced into the porous material which are known to be reactive with the contaminants that are desired to be removed from the fluid. For example, U.S. Patent No. 1,789,194 teaches the use of activated carbon impregnated with hexamethylenetetramine as a material for filtering cyanogen chloride and hydrocyanic acid. In this filter two layers of the impregnated charcoal are separated by a layer of a granular alkali which serves as a drying agent within the filter. U.S. Patent No. 1,595,788 teaches impregnating one layer of a filter with a suitable material to reduce the degree of absorption of that layer.

The present invention distinguishes from any of the prior art filters in that it contains a sorbent bed consisting of at least two distinctly different porous substances, only one of which is impregnated with a strong oxidizing agent reactive with hydrazine and its derivatives. It has been found that none of the prior art filters have been effective in removing hydrazine and hydrazine derivatives from fluids but by providing a filter in accordance with this invention, an improved filter results which is effective in removing these contaminants from fluids.

SUMMARY OF THE INVENTION

This invention relates to a filter and more particularly to a filter method and apparatus for removing contaminants of hydrazine and its organic derivatives from fluids. The filter operates by having at least two distinctly different porous materials which are known for their sorbing properties arranged in layers or in a mixed relation. In the layer method the upstream layer is impregnated with a strong oxidizing agent while the downstream layer remains unimpregnated. The vapors of hydrazine or organic derivatives of hydrazine on first entering the filter react with the oxidizing agent to form volatile and non-volatile substances. The non-volatile substances are sorbed by the impregnated material and the volatile substances that pass through the impregnated material are then sorbed by the non-impregnated material. It is to be understood however that the invention is not intended to be restricted to any particular theory.

It is an object of this invention to provide an improved filter method and apparatus for removing vapors of hydrazine and organic derivatives of hydrazine from air or other fluids containing these contaminants.

It is a further object of this invention to provide a filter method and apparatus for removing hydrazine and hydrazine derivatives from gases being exhausted from chemical processing equipment.

It is a further object of this invention to provide a filter method and apparatus that may be integrally connected wtih chemical laboratory hoods for removal of hydrazine and hydrazine derivatives from air being exhausted from the laboratory rooms.

DESCRIPTION OF THE PREFERRED EMBODIMENTS

The filter is generally indicated by the numeral 6 and is comprised of a canister or cartridge 8 which may be constructed of a wide range of materials, in fact any material is contemplated and within the scope of this invention as long as it remains chemically unreactive with the materials to be filtered and the impregnants used within this invention. Canister or cartridge 8 has formed therein upstream duct 10 and downstream duct 12. The term "upstream" refers to the direction from which the air or fluid would first pass and is indicated by arrows $a$ and $b$. In each drawing the arrow lettered $a$ indicates the upstream direction and $b$ the downstream direction.

Figure 1:
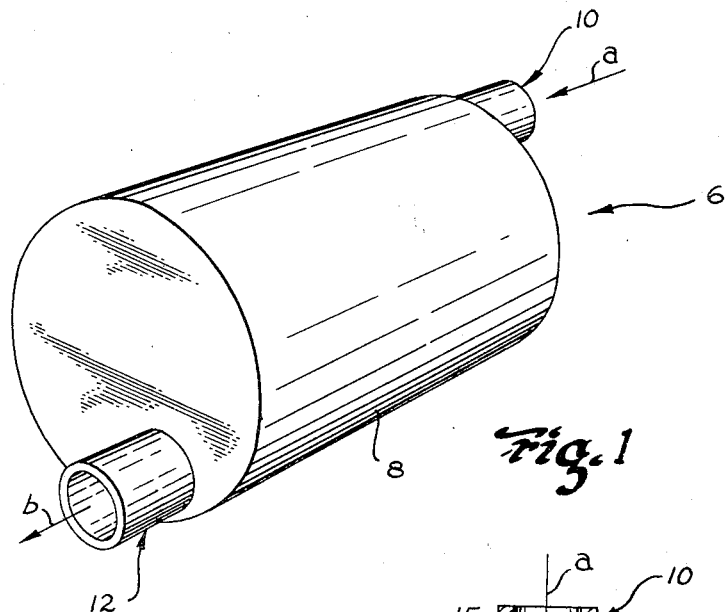
FIG. 1 is a perspective view showing an embodiment of the invention.
Figure 2:
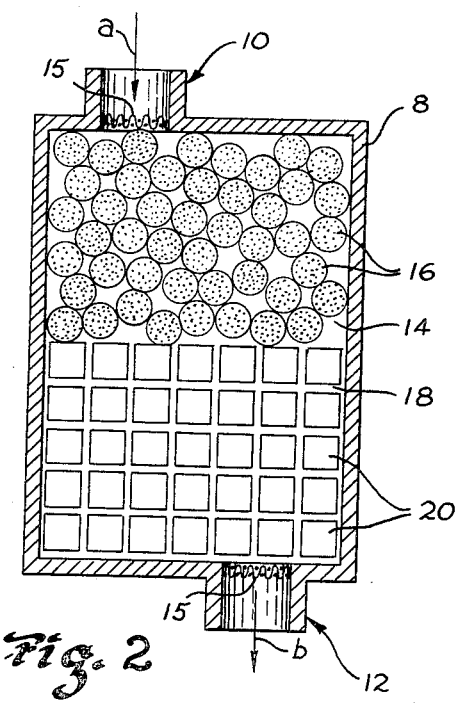
FIG. 2 is a longitudinal cross-sectional view of the embodiment as found in FIG. 1 showing the two-layer sorbing bed in diagrammatic form.

One embodiment of the invention as is illustrated diagrammatically in FIG. 2 consists of two separate sorbing beds or layers, upstream layer 14 and downstream layer 18 consisting of two distinctly different porous granular materials, both materials being selected from the group consisting of activated charcoal, silica gel, activated alumina annd molecular sieves. It is to be understood that according to the present invention, the filter may be comprised of more than two porous materials and be effective, however the filter must contain at least two different porous materials, only one of which is impregnated with a strong oxidizing agent. In the drawings, circles are used to indicate one porous material while the squares indicate the second different porous material. The shapes are only for identification and do not necessarily represent the actual shapes of the granular materials. Each duct has positioned therein screen or grid 15 which maintains the porous materials within the filter. In the embodiment as shown in FIG. 1, upstream layer 14 is impregnated with a strong chemical oxidizing agent that is a solid at ordinary room temperatures. Impregnants that have been found satisfactory can be chosen from the following group: iodine ($I_2$), potassium permanganate ($KMnO_4$), potassium dichromate ($K_2Cr_2O_7$), potassium bromate ($KBrO_3$), potassium iodate ($KIO_3$).

In addition any of the foregoing potassium (K) compounds can be substituted by the corresponding sodium (Na) compounds. The agents containing potassium, however, are more readily available and generally are lower in cost than the agents containing sodium, and thus are more commonly employed as strong chemical oxidizing agents.

In accordance with this invention the sorbent bed must contain at least two different porous solid sorbent substances, only one of which is impregnated with a strong solid chemical oxidizing agent. A sorbent bed consisting of a sorbent solid impregnated with an oxidizing agent, and the same sorbent solid without the impregnated oxidizing agent will not be effective for the reason that vapors of hydrazine and its derivatives react with the oxidizing agents to form a variety of both volatile and non-volatile products. Vapors formed by the oxidation-reduction reaction that pass through the impregnated material, because of the impregnated material's particular physical structure, can be sorbed by a physically different non-impregnated material. However, if the non-impregnated material is the same material as the impregnated material, there would be no reason to expect vapors passing through the impregnated material to be sorbed by the non-impregnated material, since different samples of similar materials have identical chemical and physical properties. The filter operates successfully because molecular structures that are able to pass through one type of porous material are sorbed by another type of material if that other type material is truly different in physical properties from the first-mentioned material. Simple known techniques may be used to impregnate the porous granular sorbent solids with the strong chemical oxidizing agents. For example, the oxidizing agents may be impregnated into the solid sorbents by the liquid phase impregnation methods. This involves (a) dissolving a sufficient quantity of the solid oxidizing agent in pure water to make a saturated aqueous solution; (b) immersing a mass of a solid sorbent in the mentioned solution for approximately one hour at ordinary room temperature and occasionally stirring the mixture; (c) removing the mass of the solid sorbent from the liquid solution and drying in an oven at 250° C. for about twelve hours. Iodine as an oxidizing agent may be impregnated into a solid sorbent by a vapor phase technique. This involves placing a mixture of the solid sorbent and solid iodine in a closed vessel, heating the mixture in a vessel to an elevated temperature to vaporize the iodine (200° to 250° centigrade) and then allowing the temperature to return to normal room temperature. As the temperature decreases, the iodine vapor is sorbed by the solid sorbent. Agitation of the vessel during this process aids in obtaining a uniformly impregnated solid sorbent. Iodine also may be impregnated by the liquid phase impregnation methods previously described by using an aqueous solution of iodine and potassium iodide (iodine is only slightly soluble in water but readily dissolves in water containing dissolved potassium iodide).

When these granular solids are impregnated with solid chemical oxidizing agents, the oxidizing agents will be spread over the large internal surfaces in very thin films, perhaps only one or two molecules in thickness. The large surface area of exposed oxidizing agent in a porous granular solid will statistically increase the chances for molecules of the reducing agent, hydrazine and/or its derivatives, carried in an air or fluid stream passing through the porous solid to contact the molecules of the oxidizing agent. Thus when air or other fluids containing vapor molecules of hydrazine or an organic derivative of hydrazine contact the impregnated material, vapor molecules of the contaminants readily react with the molecules of a solid chemical oxidizing agent. When such reaction occurs, new substances with different properties are produced. Some of the new substances may be non-volatile and such non-volatile substances would remain at the internal surface of the impregnated porous solid sorbent and thus would not be carried through the sorbent bed by the air of fluid. Some of these new substances, however, may be volatile and they may have characteristics such that they would not be retained at the internal surface of the impregnated porous solid sorbent but instead would be carried through said material in the form of a vapor by the air or fluid passing through the material. If another type of porous solid in granular form having a tremendous internal surface area and not being impregnated with a chemical oxidizing agent is intimately mixed with the impregnated granules or is in the form of a layer following the layer of impregnated granules, then the molecules of the volatile product substances being carried by the air or fluid streams passing through the impregnated material may be sorbed by this second and different solid sorbent.

Contaminants that are effectively removed by the filter of this invention include:

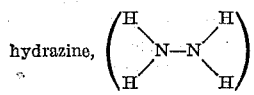

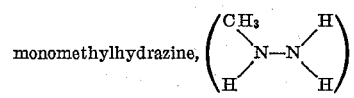

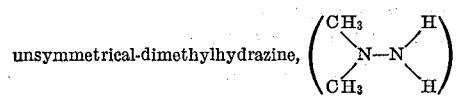

and

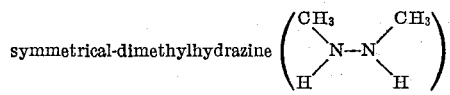

However, it has been found that the longer the organic chain in the hydrazine derivative, the more effective is the filter. Thus

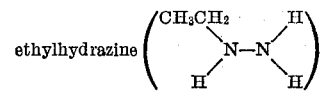

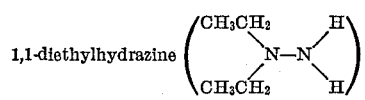

and

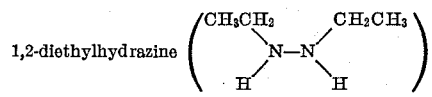

are more effectively removed from contaminated fluids than hydrazine itself. It is to be understood however that the filter of this invention is more effective for hydrazine removal than any of the prior art filters but the effective lifetime of the filter is increased when longer chain hydrazine derivates are being filtered.

Chemical theory indicates that the reactions of hydrazine or organic derivatives of hydrazine with chemical oxidizing agents often are not simple but complex and result in a wide variety of products having a wide variety of properties. The products of the oxidation-reduction reaction depend upon the reacting substances and the conditions of the reaction. Organic derivatives of hydrazine and hydrazine itself may be converted to azo compounds, tetrazene compounds, tetrazane compounds, amines, ammonia, hydrazoic acid and nitrogen. Some of the substances are volatile and noxious.

Referring to FIG. 2 as air containing contaminants in the form of hydrazine and/or its derivates, enter cartridge 8 through upstream duct 10, it comes in contact with the granular porous material 16 impregnated with a suitable oxidizing agent. An oxidation-reduction takes place in layer 14. Those products formed between this oxidation-reduction reaction which are not sorbed by impregnated layer 14 pass through layer 14 to second unimpregnated layer or downstream layer 18 which filters those substances that have passed through the upstream layer. Thus, the vapor leaving the filter through downstream duct 12 will be substantially reduced from contaminants of hydrazine and its organic derivatives. Care must be taken in the installation of the embodiment as shown in FIG. 2 so that proper vapor flow direction are observed. The vapor must first contact the impregnated material and thereafter contact the different non-impregnated material.

Figure 3:
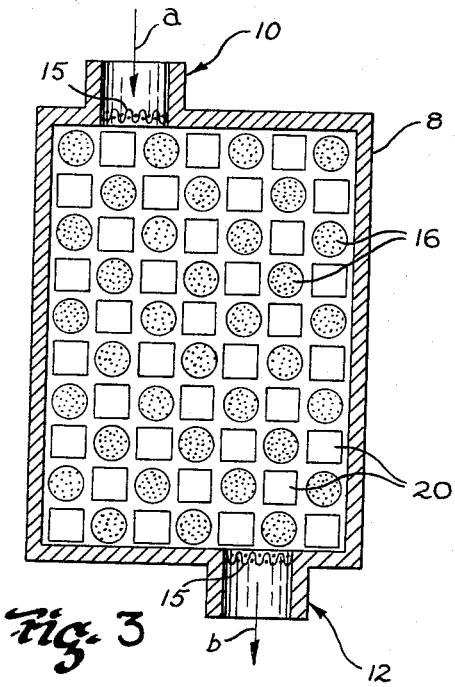
FIG. 3 is a view similar to FIG. 2 but showing the materials in the sorbing bed in mixed relation.

FIG. 3 represents another embodiment of the invention. In this embodiment impregnated sorbent material 16 and a non-impregnated sorbent material 20 are in mixed relation to each other.

We claim:

1. A filter for removing hydrazine and organic derivatives of hydrazine from air or other fluids comprising a sorbent bed comprising a number of distinctly different porous granular materials wherein at least one less than the total number of said porous materials is impregnated with a strong oxidizing agent reactive with hydrazine and its derivatives and wherein at least one of said materials is an unimpregnated material, said bed being oriented within the filter so that fluids, contacting said sorbent bed, contact the impregnated material and vapors passing through said impregnated material thereafter contact said unimpregnated material.

2. A filter of claim 1 wherein said sorbent bed consists of at least two different porous granular materials, each material comprising a layer of said sorbent bed, an upstream layer and a downstream layer, wherein said material in said upstream layer is impregnated with said oxidizing agent and said material in said downstream layer is unimpregnated.

3. A filter of claim 2 wherein said material in said upstream layer is selected from the group consisting of activated charcoal, silica gel, alumina and molecular sieves, and said material in said downstream layer is selected from the remainder of said group, and the oxidizing agent is selected from the group consisting of iodine ($I_2$), potassium permanganate ($KMnO_4$), potassium dichromate ($K_2CR_2O_7$), potassium bromate ($KBrO_3$), potassium iodate ($KIO_3$), sodium permanganate ($NaMnO_4$), sodium dichromate ($Na_2Cr_2O_7$), sodium bromate ($NaBrO_3$), and sodium iodate ($NaIO_3$).

4. A filter of claim 1 wherein said sorbent bed consists of two distinctly different porous granular materials in mixed relationship with each other, only one of said porous granular materials being impregnated with a strong oxidizing agent.

5. A filter of claim 4 wherein one porous granular material is selected from the group consisting of activated charcoal, silica gel, alumina and molecular sieves and the other of said materials is selected from the remainder of the group, and the oxidizing agent is selected from the group consisting of iodine ($I_2$), potassium permanganate ($KMnO_4$), potassium dichromate ($K_2Cr_2O_7$), potassium bromate ($KBrO_3$), potassium iodate ($KIO_3$), sodium permanganate ($NaMnO_4$), sodium dichromate ($Na_2Cr_2O_7$), sodium bromate ($NaBrO_3$), and sodium iodate ($NaIO_3$).

6. A filter for removing hydrazine and organic derivatives of hydrazine from air or other fluids comprising a cartridge having upstream and downstream ducts and within said cartridge a sorbent bed consisting of two layers of a porous granular material, an upstream layer and a downstream layer wherein said porous material in the upstream layer is selected from the group consisting of activated charcoal, silica gel, alumina and molecular sieves and the downstream layer selected from any remaining material of said group not used in the upstream layer, the upstream layer being impregnated with an oxidizing agent selected from the group consisting of iodine ($I_2$), potassium permanganate ($KMnO_4$), potassium dichromate ($K_2Cr_2O_7$), potassium bromate ($KBrO_3$), potassium iodate ($KIO_3$), sodium permanganate ($NaMnO_4$), sodium dichromate ($Na_2Cr_2O_7$), sodium bromate ($NaBrO_3$), and sodium iodate ($NaIO_3$).

7. A filter for removing hydrazine and organic derivatives of hydrazine from air or other fluids comprising a cartridge having upstream and downstream ducts and within said cartridge a sorbent bed consisting of two different porous granular materials in admixed relation, wherein one of said materials is selected from the group consisting of activated charcoal, silica gel, and alumina molecular sieves, and the other selected from the remainder of this group, in which only one of the selected materials is impregnated with an oxidizing agent selected from the group consisting of iodine ($I_2$), potassium permanganate ($KMnO_4$), potassium dichromate ($K_2Cr_2O_7$), potassium bromate ($KBrO_3$), potassium iodate ($KIO_3$), sodium permanganate ($NaMnO_4$), sodium dichromate ($Na_2Cr_2O_7$), sodium bromate ($NaBrO_3$), and sodium iodate ($NaIO_3$).

8. A method of removing hydrazine and organic derivatives of hydrazine from air or other fluids comprising the steps of:

(a) providing a number of distinctly different porous granular materials, (b) impregnating at least one less than the total number of said porous materials with a strong oxidizing agent which oxidizing agent is reactive with hydrazine and its derivates, thereby providing at least one impregnated material and at least one unimpregnated material, (c) orienting said porous materials within the body of a filter so that fluids from which hydrazine and organic derivatives of hydrazine are to be removed contact said impregnated material and vapors passing through said impregnated material thereafter contact said unimpregnated material.

9. A method as set forth in claim 8 wherein said different porous granular materials are arranged in layers, an upstream layer and a downstream layer, wherein an upsteam layer is impregnated and a downstream layer is unimpregnated.

10. The method as set forth in claim 8, wherein said different porous granular materials are arranged in mixed relationship with each other and wherein one of said porous granular materials is unimpregnated.

References Cited

UNITED STATES PATENTS

| | | | |
|---|---|---|---|
| 2,930,184 | 3/1960 | Plescia et al. | 23—190 X |
| 2,992,703 | 7/1961 | Vasan et al. | 55—62 |
| 3,165,382 | 1/1965 | Forte | 23—190 |
| 3,318,662 | 5/1967 | Pauling | 23—168 |
| 3,345,125 | 10/1967 | Kruel et al. | 23—178 |

FOREIGN PATENTS 825,462  12/1959  Great Britain.

REUBEN FRIEDMAN, Primary Examiner

C. N. HART, Assistant Examiner

U.S. Cl. X.R.

23—4, 252, 284; 55—74